United States Patent

Moser et al.

Patent Number: 5,084,068
Date of Patent: Jan. 28, 1992

[54] DYES CONTAINING TWO PHTHALOCYANINE GROUPS LINKED BY A RADICAL CONTAINING TWO QUATERNIZED NITROGEN ATOMS

[75] Inventors: Helmut A. Moser, Oberwil, Switzerland; Roland Wald, Huningue, France

[73] Assignee: Sandoz Ltd., Basel, Switzerland

[21] Appl. No.: 484,583

[22] Filed: Feb. 23, 1990

[30] Foreign Application Priority Data

Feb. 23, 1989 [DE] Fed. Rep. of Germany ....... 3905507

[51] Int. Cl.$^5$ .................. C09B 47/32; C09B 47/36; D06P 3/60; C07D 209/56
[52] U.S. Cl. .................................. 8/661; 8/527; 8/919; 540/132; 540/133
[58] Field of Search .............. 540/132, 133; 8/661, 8/919, 527

[56] References Cited

U.S. PATENT DOCUMENTS

| | | | |
|---|---|---|---|
| 2,945,849 | 7/1960 | Kruckenberg | 260/185 |
| 3,325,511 | 6/1967 | Lesslie et al. | 540/133 |
| 3,635,940 | 1/1972 | Hegar et al. | 260/155 |
| 4,363,761 | 12/1982 | Pedrazzi | 260/153 |
| 4,499,018 | 2/1985 | Dore et al. | 540/132 |
| 4,670,546 | 6/1987 | Dore et al. | 534/612 |
| 4,675,388 | 6/1987 | Greve et al. | 534/608 |

FOREIGN PATENT DOCUMENTS

| | | |
|---|---|---|
| 2338151 | 2/1974 | Fed. Rep. of Germany . |
| 1276317 | 1/1972 | United Kingdom . |

Primary Examiner—Mark L. Berch
Assistant Examiner—E. C. Ward
Attorney, Agent, or Firm—Gerald D. Sharkin; Richard E. Vila; Melvyn M. Kassenoff

[57] ABSTRACT

Compounds of the formula

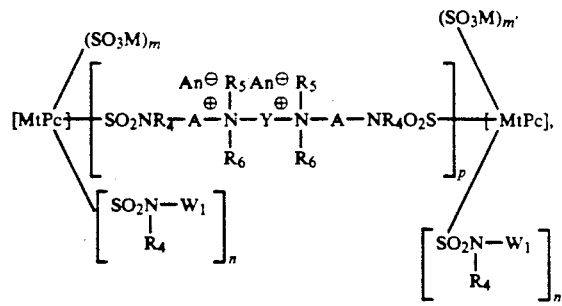

and mixtures thereof, wherein each $Mt$ is independently copper, nickel or cobalt, each $Pc$ is the phthalocyanine radical, each $R_4$ is independently hydrogen, $C_{1-4}$alkyl or $C_{1-4}$alkyl monosubstituted by hydroxy, each $R_5$ and $R_6$ is independently $C_{1-4}$alkyl; $C_{1-4}$alkyl monosubstituted by halo, cyano, hydroxy or phenyl; or $C_{5-6}$cycloalkyl, each $W_1$ is independently $-A-{}^{\oplus}NR_1R_2R_3\ An^{\ominus}$ or $-A-NR_2R_3$, wherein $R_1$ is hydrogen; $C_{1-4}$alkyl; $C_{1-4}$alkyl monosubstituted by halo, cyano, hydroxy or phenyl; or $C_{5-6}$cycloalkyl, and each of $R_2$ and $R_3$ is independently $C_{1-4}$alkyl; $C_{1-4}$alkyl monosubstituted by halo, cyano, hydroxy or phenyl; or $C_{5-6}$cycloalkyl, $Y$ is a divalant radical linked to each of the two quarternized nitrogen atoms by an aliphatic carbon atom, each $M$ is independently hydrogen or a non-chromophoric cation, each of $m$ and $m'$ is independently 0 or 1, each of $n$ and $n'$ is independently 1, 2 or 3, and $p$ is 1 or 2, with the provisos that $m+n+p \leq 4$, and $m'+n'+p \leq 4$, wherein each $A$ is independently linear or branched $C_{2-6}$alkylene or linear or branched $C_{3-6}$alkylene monosubstituted by hydroxy, and each $An^{\ominus}$ is independently a non-chromophoric anion, liquid and solid dye compositions comprising them and their use for dyeing and printing hydroxy group- and nitrogen-containing organic substrates, particularly textile materials comprising cellulose, especially cotton, bast fibres, leather and paper.

20 Claims, No Drawings

DYES CONTAINING TWO PHTHALOCYANINE GROUPS LINKED BY A RADICAL CONTAINING TWO QUATERNIZED NITROGEN ATOMS

This invention relates to phthalocyanine compounds which are connected via a nitrogen-containing bridge, a process for their production and their use in dyeing and printing processes.

More particularly, the invention provides compounds of formula I

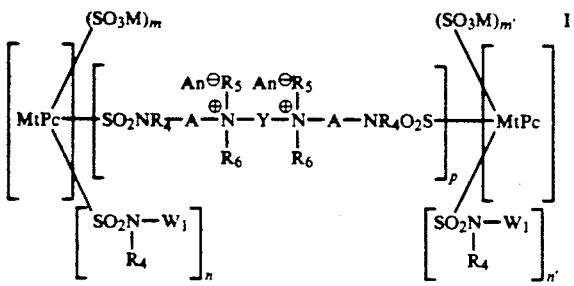

wherein
each $W_1$ independently is $-A-\overset{\oplus}{N}R_1R_2R_3 \; An^{\ominus}$ or $-A-NR_2R_3$,
each $R_1$ independently is hydrogen, unsubstituted $C_{1-4}$alkyl, $C_{1-4}$alkyl monosubstituted by halogen, cyano, hydroxy or phenyl, or $C_{5-6}$cycloalkyl,
each $R_2$ and $R_3$ independently is unsubstituted $C_{1-4}$alkyl, $C_{1-4}$alkyl monosubstituted by halogen, cyano, hydroxy or phenyl, or $C_{5-6}$cycloalkyl,
each M is independently hydrogen or a non-chromophoric cation,
each $An^{\ominus}$ is independently a non-chromophoric anion,
each $R_4$ independently is hydrogen, unsubstituted $C_{1-4}$alkyl or monohydroxy-substituted $C_{1-4}$alkyl,
each A independently is $-C_{2-6}$alkylene- or monohydroxy-substituted $-C_{3-6}$alkylene-,
Y is a divalent bridge member which on both ends is connected via an aliphatic carbon atom,
each $R_5$ and $R^6$ independently is unsubstituted $C_{1-4}$alkyl, $C_{1-4}$alkyl monosubstituted by halogen, cyano, hydroxy or phenyl, or $C_{5-6}$cycloalkyl,
each Pc is the phthalocyanine radical (ring),
each Mt independently is copper, nickel or cobalt,
each of m and m' is independently is 0 or 1,
each n and n' is independently is 1, 2 or 3, and p is 1 or 2,
with the provisos that $m+n+p<4$ and $m'+n'+p<4$,
and mixtures of compounds of formula I,
with the proviso that in a mixture of compounds of formula I the average value of p is 1 to 2, inclusive.

Preferably, none of the four subrings of each phthalocyanine ring contains more than one substituent selected from those to which m, m', n, n' and p relate.

In the specification, any alkyl or alkylene group capable of being linear or branched is linear or branched unless indicated to the contrary. In any hydroxy-substituted alkyl or alkylene group which is bonded to nitrogen, the hydroxy group is preferably located at a carbon atom which is not directly attached to this nitrogen atom.

Preferably, any halogen is fluorine, chlorine or bromine, more preferably chlorine or bromine and especially chlorine.

Each Mt independently is preferably copper or nickel.

$R_1$ is preferably $R_{1a}$, where each $R_{1a}$ is independently hydrogen, methyl, ethyl, $C_{2-3}$alkyl monosubstituted by chlorine, cyano or hydroxy, benzyl or cyclohexyl. More preferably, it is $R_{1b}$, where each $R_{1b}$ is independently hydrogen, methyl, ethyl, 2-hydroxyethyl, 2-hydroxypropyl, 3-hydroxypropyl, benzyl or cyclohexyl. Most preferably, $R_1$ is $R_{1c}$, where each $R_{1c}$ is independently hydrogen, methyl or ethyl.

Each $R_2$ and $R_3$ is preferably $R_{2a}$ and $R_{3a}$, where each $R_{2a}$ and $R_{3a}$ independently is methyl, ethyl, $C_{2-3}$alkyl monosubstituted by chlorine, cyano or hydroxy, benzyl or cyclohexyl. More preferably, $R_2$ and $R_3$ are $R_{2b}$ and $R_{3b}$, where each $R_{2b}$ and $R_{3b}$ independently is methyl, ethyl, 2-hydroxyethyl, 2-hydroxypropyl, 3-hydroxypropyl, benzyl or cyclohexyl. Most preferably, they are $R_{2c}$ and $R_{3c}$, where each $R_{2c}$ and $R_{3c}$ independently is methyl or ethyl.

$R_4$ is preferably $R_{4a}$, where each $R_{4a}$ independently is hydrogen, methyl, ethyl or 2-hydroxyethyl. More preferably, it is $R_{4b}$, where each $R_{4b}$ independently is hydrogen or methyl. Most preferably each $R_4$ is hydrogen.

Any alkylene as A is preferably a $C_{2-4}$alkylene group, for example $-(CH_2)_q-$ in which q is 2, 3 or 4,

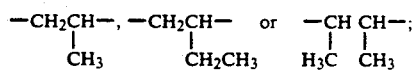

especially $-(CH_2)_{q'}-$ in which q' is 2 or 3.

Any hydroxy-substituted alkylene as A preferably contains 3 or 4 carbon atoms.

Preferably, A is $A_1$ where each $A_1$ independently is $-C_{2-4}$alkylene- or monohydroxy-substituted $-C_{3-4}$alkylene-.

More preferably, A is $A_2$ where each $A_2$ independently is $-C_{2-4}$alkylene-.

Most preferably, A is $A_3$ where each $A_3$ independently is $-(CH_2)_{q'}$-wherein q'0 is 2 or 3.

Each $W_1$ is preferably $W_{1a}$ where each $W_{1a}$ independently is $-A_1-\overset{\oplus}{N}R_{1a}R_{2a}R_{3a} \; An^{\ominus}$ or $-A_1-NR_{2a}R_{3a}$. More preferably, it is $W_{1b}$ where each $W_{1b}$ independently is $-A_2-\overset{\oplus}{N}R_{1b}R_{2b}R_{3b} \; An^{\ominus}$ or $-A_2-NR_{2b}R_{3b}$. Most preferably, $W_1$ is $W_{1c}$ where each $W_{1c}$ independently is $-A_3-\overset{\oplus}{N}R_{1c}R_{2c}R_{3c} \; An^{\ominus}$ or $-A_3-NR_{2c}R_{3c}$.

Y is preferably $Y_1$ where each $Y_1$ is independently $-C_{2-6}$alkylene-, monohydroxy- or dihydroxy-substituted $-C_{3-8}$alkylene-, a $-C_{2-6}$alkylene-chain which is interrupted by $-O-$, $-NR_7-$ or

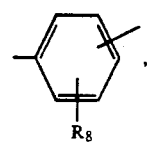

or a monohydroxy- or dihydroxy-substituted $-C_{3-8}$alkylene- chain which is interrupted by $-O-$, $-NR_7-$ or

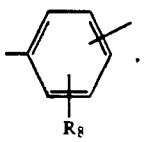

wherein
R$_7$ is hydrogen or C$_{1-6}$alkyl, and
R$_8$ is hydrogen, halogen, C$_{1-4}$alkyl or C$_{1-4}$alkoxy.

More preferably, Y is Y$_2$ where each Y$_2$ is independently -C$_{2-4}$alkylene-, monohydroxy-substituted-C$_{3-4}$alkylene- or -T$_1$-X-T$_2$-, wherein each T$_1$ and T$_2$ independently is -C$_{1-3}$alkylene- or monohydroxy-substituted-C$_{3\text{or}4}$alkylene-, and X is -NR$_{7a}$- or

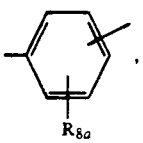

wherein
R$_{7a}$ is hydrogen or C$_{1-4}$alkyl, and
R$_{8a}$ is hydrogen, chlorine, methyl or methoxy.

Most preferably, Y is Y$_3$ where each Y$_3$ is independently -C$_{2\text{or}3}$alkylene-, monohydroxy-substituted-C$_{3-4}$alkylene- or

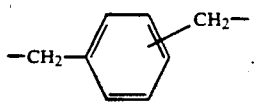

Each R$_5$ and R$_6$ is preferably R$_{5a}$ and R$_{6a}$ where each R$_{5a}$ and R$_{6a}$ independently is methyl, ethyl, C$_{2-3}$alkyl monosubstituted by chlorine, cyano or hydroxy, benzyl or cyclohexyl; more preferably, R$_5$ and R$_6$ are R$_{5b}$ and R$_{6b}$ where each R$_{5b}$ and R$_{6b}$ independently is methyl, ethyl, 2-hydroxyethyl, 2-hydroxypropyl, 3-hydroxypropyl, benzyl or cyclohexyl. Most preferably, R$_5$ and R$_6$ are R$_{5c}$ and R$_{6c}$ where each R$_{5c}$ and R$_{6c}$ independently is methyl or ethyl.

When an M is a non-chromophoric cation, it is preferably lithium, sodium, potassium, ammonium, mono-, di-, tri or tetra-methylammonium, mono-, di-, tri- or tetra-ethylammonium or mono-, di- or tri-(2-hydroxyethyl-)ammonium.

m and m' are preferably 0 and in mixtures their average values are independently preferably 0 to 0.5, inclusive.

n and n' are independently preferably 2 or 3, more preferably 2, and, in mixtures, their average values are independently preferably 2 to 3, inclusive, and more preferably 2 to 2.5, inclusive.

p is preferably 1.

In formulae I, Ia and II and the preferred groups of such compounds, when a particular variable other than M and An$^\ominus$ appears in a formula more than once, the occurrences of that variable are preferably identical. More preferably, the M's are also identical, the An$^\ominus$'s are also identical, and, in mixtures, the average values of m and m' are also identical, and the average values of n and n' are also identical.

Preferred compounds of formula I correspond to formula Ia

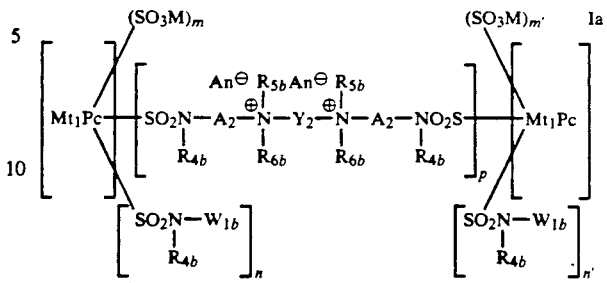

wherein Mt$_1$ is copper or nickel, and mixtures of compounds of formula Ia.

Preferred compounds of formula Ia are those in which
(1) each A$_2$ independently is A$_3$;
(2) Y$_2$ is Y$_3$;
(3) each W$_{1b}$ independently is W$_{1c}$;
(4) each R$_{4b}$ is hydrogen;
(5) those of (1) to (4) in which each R$_{5b}$ and R$_{6b}$ independently is R$_{5c}$ and R$_{6c}$.

Further according to the invention, there is provided a process for preparing compounds of formula I comprising reacting two compounds of formula II

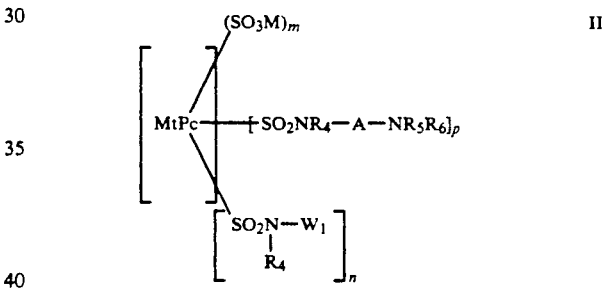

wherein M, Mt, Pc, A, W$_1$, R$_4$, R$_5$, R$_6$, m, n and p are as defined above, which compounds may be the same or different, with a Y-yielding compound thereby quaternising the -NR$_5$R$_6$ group of each compound of formula II.

The linking of two compounds of formula II is conveniently carried out at an elevated temperature of 50° to 80° C., preferably 60° to 70° C., and in an alkaline medium, preferably at pH 8 to 10. The reaction medium is water advantageously mixed with an organic solvent, for example, dimethylformamide.

A compound of formula I may be isolated from the reaction mixture in a manner known per se in the form of a presscake or after drying in powder or granular form. It may also be used per se in the form of the solution obtained, i.e., without isolation from the reaction medium.

The compounds of formula II used as starting materials are either known or may be obtained in accordance with known methods from known starting compounds.

The compounds of formula I are normally present in water-soluble salt form. Suitable non-chromophoric anions An$^\ominus$ that can be introduced by reacting a protonatable nitrogen atom and/or quaternary ammonium group with an organic or inorganic acid are, for example, the following: chloride, bromide, iodide, sulphate, bisulphate, methylsulphate, ethylsulphate, aminosulphate, hydrogen sulphate, perchlorate, benzenesulphonate, oxalate, maleinate, acetate, methoxyacetate, formate, propionate, lactate, succinate, tartrate, malate and methanesulphonate; also, the anions of acids such as boric acid, citric acid, glycolic acid, diglycolic acid and adipic acid and addition products of ortho-boric acid with polyalcohols, e.g., cis-polyols.

Except where the contrary is evident, the term "compounds of formula I" includes mixtures of such compounds.

The compounds of formula I in water-soluble salt form can be used as dyestuffs for dyeing or printing hydroxy group- or nitrogen-containing organic substrates. They are suitable for dyeing or printing cationically dyeable materials such as single or mixed polymers of acrylonitrile, acid-modified polyamide and polyester fibres; leather, cotton, bast fibres such as hemp, flax, sisal, jute, coir fibres and straw; regenerated cellulose fibres, glass fibres and paper.

The compounds of formula I can be used for example for dyeing or printing fibres, filaments and textiles produced therefrom which consist of or contain cellulose material, e.g., cotton, according to known methods. Cotton is preferably dyed by the conventional exhaust process, for example from a long or short liquor and at room temperature to boiling temperature. One preferred method for effecting printing employs impregnation with a printing paste which can be prepared by known methods.

The compounds of formula I can also be used for dyeing and printing leather by known methods and in particular of low-affinity types of leather which have undergone vegetable retanning.

The compounds of formula I are especially suited for dyeing and printing paper and paper products, e.g., for the production of sized or unsized, wood-free or in particular wood-containing paper (so-called mechanical wood pulp) in pulp form as well as on the size press. A further suitable method for the dyeing of paper uses the dipping process. Dyeing and printing of paper may be effected by known methods.

The dyeings and prints obtained, in particular those on paper, have good fastness to use properties.

The compounds of formula I may be used directly (in powder form or as a solution) as dyestuffs, or may be used in the form of dyeing preparations. The processing into stable liquid, preferably aqueous, and solid dyeing preparations may be carried out by known methods. For example, suitable liquid preparations may be obtained by dissolving a compound of formula I, or a mixture thereof, in suitable solvents such as mineral acids or organic acids, e.g., hydrochloric acid, sulphuric acid, phosphoric acid, formic acid, acetic acid, lactic acid, glycolic acid, methanesulphonic acid and citric acid; or further solvents such as formamide, dimethylformamide, urea; glycols and their ethers which are used in a mixture with water, optionally in the presence of an assistant, e.g., a stabilizer. Such preparations may be produced for example as described in French Patent Specification No. 1,572,030.

A preferred liquid preparation is for example (parts are by weight):
- 100 parts of a compound of formula I, or a mixture thereof,
- 1-100, preferably 1-10, parts of an inorganic salt,
- 1-100 parts of an organic acid such as formic, acetic, lactic, citric, propionic and methoxyacetic acid,
- 100-800 parts of water,
- 0-500 parts of a dissolving assistant (e.g., glycols such as ethylene glycol, propylene glycol, di- or triethylene glycol, hexylene glycol; glycol ethers such as Methyl Cellosolve ®, Methyl Carbitol ®, butyl polyglycol; urea, formamide and dimethylformamide).

Similarly, the compounds of formula I can be processed according to known methods into solid, preferably granulated, dyeing preparations, suitably by granulating as described in French Patent Specification No. 1,581,900.

A preferred solid preparation is for example (parts are by weight):
- 100 parts of a compound of formula I, or a mixture thereof,
- 1-100, preferably 1-10, parts of an inorganic salt,
- 0-800 parts of a standardising agent (preferably non-ionic such as dextrin, sugar, grape sugar and urea).

The solid preparation may contain up to 10% residual moisture.

The compounds of formula I have good solubility properties and are especially notable for their good solubility in cold water. Due to their high substantivity, the dyestuffs are absorbed practically quantitatively and show good build-up. When producing sized and unsized paper, the waste water is practically colourless or is only slightly coloured. The dyestuffs can be added to the paper pulp directly, i.e., without pre-dissolving, as a dry powder or as granules, without any reduction in brilliance or in colour yield.

However, the compounds of formula I are preferably used in solution or as aqueous liquid dyeing preparations.

When compared with unsized paper dyeings, the sized paper dyeings show no loss of depth. The compounds of formula I can also be used for dyeing in soft water where the full colour yield is obtained. They do not mottle, especially when dyed on wood-containing paper, are not inclined to produce two-sided effects on paper and are substantially insensitive towards fillers and pH variations.

The dyed papers have a high level of fastness to bleeding. They show very good wet fastness properties not only to water, but also to milk, fruit juices, sweetened mineral water, soap water, tonic water, sodium chloride solution, and urine. In addition, they have good alcohol fastness.

Paper which has been dyed with a compound of formula I, or a mixture of such compounds, can be bleached both by oxidation and by reduction, which is important for the re-use of waste paper.

Fibrous materials containing mechanical wood pulp are dyed with the compounds according to the invention in a good and even quality.

The following examples illustrate the invention. In the examples, all parts and percentages are by weight, unless indicated to the contrary, and all temperatures are given in degrees celsius.

EXAMPLE 1

10.7 Parts of the dyestuff having the formula

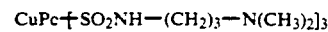

are reacted with 1.12 parts of epichlorohydrin (20% excess) at 70° and pH 8.5 using as the reaction medium 200 parts of dimethylformamide mixed with 50 parts of water. The pH is maintained at 8.5 to 9 by adding a 30% sodium hydroxide solution. The resultant condensation product is precipitated from the alkaline reaction medium by adding water, and after filtration the product is isolated as a wet presscake. The dyestuff thus obtained having the formula

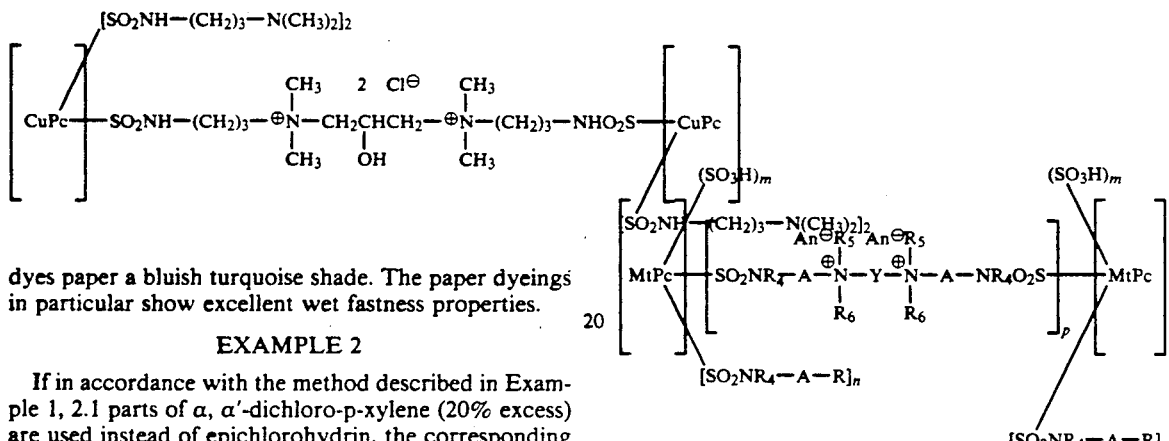

dyes paper a bluish turquoise shade. The paper dyeings in particular show excellent wet fastness properties.

EXAMPLE 2

If in accordance with the method described in Example 1, 2.1 parts of α, α'-dichloro-p-xylene (20% excess) are used instead of epichlorohydrin, the corresponding copper phthalocyanine dyestuff is obtained containing as a bridge by which the two ammonium groups are linked together, a group

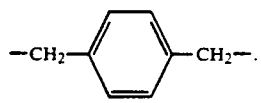

This dyestuff dyes paper bluish turquoise. The paper dyeings thus obtained show perfect wet fastness properties.

EXAMPLES 3 to 20 / Table

By analogy with the method described in Examples 1 and 2, using appropriate starting compounds, further compounds of formula I may be prepared. These compounds correspond to formula A, (A)

$$\left[ MtPc \underset{[SO_2NR_4-A-R]_n}{\overset{(SO_3H)_m}{\underset{[SO_2NH-(CH_2)_3-N(CH_3)_2]_2}{\Bigg|}}} SO_2NR_4-A-\overset{\oplus}{\underset{R_6}{N}}-Y-\overset{\oplus}{\underset{R_6}{N}}-A-NR_4O_2S \underset{[SO_2NR_4-A-R]_n}{\overset{(SO_3H)_m}{\Bigg|}} MtPc \right]_p \underset{An^{\ominus}R_5}{\overset{An^{\ominus}R_5}{}}$$

in which the various symbols are as defined in the following Table.

Under the third column of this Table, the symbols used for Y are defined as follows:

$Y_a$ is

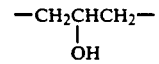

$Y_b$ is

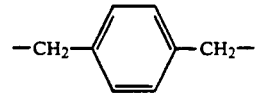

$Y_c$ is $-CH_2CH_2-$

The numbers which are given for p, m and n are average values resulting from the corresponding composition of a mixture of compounds of formula A. In the Table, m for each o dyes 3 to 20 is 0.5.

In the examples of the Table, each $An^{\ominus}$ as a non-chromophoric anion is acetate optionally in the presence of chloride.

The compounds of Examples 3 to 20 dye paper a bluish to greenish turquoise shade. The paper dyeings thus obtained show perfect wet fastness properties.

TABLE

| | | | Compounds of formula (A) | | | | | | |
|---|---|---|---|---|---|---|---|---|---|
| Ex. No. | Mt | Y | A | R | $R_4$ | $R_5$ | $R_6$ | p | n |
| 3 | Cu | $Y_a$ | $-(CH_2)_3-$ | $-N(CH_3)_2$ | H | $CH_3$ | $CH_3$ | 1 | 2 |
| 4 | Cu | $Y_a$ | $-(CH_2)_3-$ | $-N(CH_3)_2$ | $CH_3$ | $CH_3$ | $CH_3$ | 1 | 2 |
| 5 | Cu | $Y_a$ | $-(CH_2)_2-$ | $-N(C_2H_5)_2$ | H | $C_2H_5$ | $C_2H_5$ | 1 | 2 |
| 6 | Cu | $Y_a$ | $-(CH_2)_2-$ | $-N(CH_3)_2$ | H | $CH_3$ | $CH_3$ | 1.5 | 2 |
| 7 | Cu | $Y_b$ | $-(CH_2)_3-$ | $-N(CH_3)_2$ | $CH_3$ | $CH_3$ | $CH_3$ | 1.5 | 2 |
| 8 | Cu | $Y_c$ | $-(CH_2)_3-$ | $-N(CH_3)_2$ | H | $CH_3$ | $CH_3$ | 1.5 | 2 |
| 9 | Ni | $Y_a$ | $-(CH_2)_2-$ | $-N(C_2H_5)_2$ | $CH_3$ | $C_2H_5$ | $C_2H_5$ | 1 | 2.5 |
| 10 | Co | $Y_b$ | $-(CH_2)_3-$ | $-N(CH_3)_2$ | H | $CH_3$ | $CH_3$ | 1 | 2.5 |
| 11 | Cu | $Y_a$ | $-(CH_2)_3-$ | $-\overset{\oplus}{N}(CH_3)_3$ | H | $CH_3$ | $CH_3$ | 1 | 2.5 |
| 12 | Cu | $Y_a$ | $-(CH_2)_2-$ | $-\overset{\oplus}{N}(CH_3)_3$ | $CH_3$ | $CH_3$ | $CH_3$ | 1.5 | 2 |

TABLE-continued

| Ex. No. | Mt | Y | A | R | $R_4$ | $R_5$ | $R_6$ | p | n |
|---|---|---|---|---|---|---|---|---|---|
| 13 | Cu | $Y_a$ | $-(CH_2)_2-$ | $-{}^{\oplus}N(C_2H_5)_2$<br>$\mid$<br>$CH_3$ | H | $C_2H_5$ | $C_2H_5$ | 1.5 | 2 |
| 14 | Co | $Y_a$ | $-(CH_2)_3-$ | $-{}^{\oplus}N(CH_3)_3$ | $CH_3$ | $CH_3$ | $CH_3$ | 1 | 2.5 |
| 15 | Ni | $Y_b$ | $-(CH_2)_3-$ | $-{}^{\oplus}N(CH_3)_3$ | H | $CH_3$ | $CH_3$ | 1 | 2.5 |
| 16 | Cu | $Y_a$ | $-(CH_2)_3-$ | $-N(CH_3)_2$ | H | $CH_3$ | $CH_3$ | 1 | 2.5 |
| 17 | Cu | $Y_c$ | $-(CH_2)_2-$ | $-N(CH_3)_2$ | H | $CH_3$ | $CH_3$ | 1 | 2.5 |
| 18 | Cu | $Y_a$ | $-(CH_2)_2-$ | $-N(C_2H_5)_2$ | H | $C_2H_5$ | $C_2H_5$ | 1 | 2.5 |
| 19 | Ni | $Y_a$ | $-(CH_2)_3-$ | $-N(CH_3)_2$ | H | $CH_3$ | $CH_3$ | 1 | 2.5 |
| 20 | Ni | $Y_c$ | $-(CH_2)_3-$ | $-{}^{\oplus}N(CH_3)_3$ | H | $CH_3$ | $CH_3$ | 1 | 2.5 |

In the following examples the application of the compounds according to the invention is illustrated.

APPLICATION EXAMPLE A

70 Parts of chemically bleached sulphite cellulose of pinewood and 30 parts of chemically bleached sulphite cellulose of birchwood are ground in a Hollander in 2000 parts of water. 0.1 Part of the dyestuff of Example 1 is added to this mass. After mixing for 20 minutes, paper is produced therefrom. The absorbent paper obtained in this way is dyed bluish turquoise. The waste water is colourless.

APPLICATION EXAMPLE B 0.2 Part of the dyestuff of Example 1 is added to 100 parts of chemically bleached sulphite cellulose, which have been ground in a Hollander in 200 parts of water. After thorough mixing for 15 minutes, sizing is carried out in the usual way using rosin size and aluminium sulphate. Paper which is produced from this material has a bluish turquoise shade and possesses perfect properties with respect to waste water colouration and wet fastness.

APPLICATION EXAMPLE C

An absorbent length of unsized paper is drawn through a dye liquor of the following composition at 40°-50°:

0.2 part of the dyestuff of Example 1,
0.5 part of starch, and
99.3 parts of water.

The excess dye liquor is squeezed out through two rollers. The dried length of paper is dyed turquoise and has a high level of wet fastnesses.

Similarly, the dyestuffs of Examples 2 to 20 may be used to dye paper in accordance with the method described in Application Examples A to C. The paper dyeings thus obtained have a bluish to greenish turquoise shade and show good fastness properties.

APPLICATION EXAMPLE D 1.0 Part of the dyestuff of Example 1 is dissolved at 40° in 4000 parts of demineralised water. 100 Parts of pre-moistened cotton fabric are added to the bath, which is heated to boiling temperature over the course of 30 minutes. The bath is held at the boil for one hour, and the water that evaporates is continuously replaced. The dyed fabric is then removed from the liquor, rinsed with water and dried. The dye-stuff absorbs practically quantitatively onto the fibres; the dyebath is colourless. A turquoise dyeing with good fastness properties is obtained.

Similarly, the dyestuffs of Examples 2 to 20 may be employed to dye cotton in accordance with the method described in Application Example D.

APPLICATION EXAMPLE E

100 Parts of freshly tanned and neutralised chrome grain leather are drummed for 30 minutes in a vat containing a dye liquor of 250 parts of water of 55° and 0.5 part of the dyestuff of Example 1 and are treated in the same bath for a further 30 minutes with 2 parts of an anionic fat liquor based on sulphonated train oil. The leathers are dried and finished in the usual way. An evenly dyed leather in a turquoise shade is obtained.

Similarly, the dyestuffs of Examples 2 to 20 can be used to dye leather in accordance with the above method.

Further low-affinity, vegetable-retanned leathers may similarly be dyed according to known methods.

APPLICATION EXAMPLE F

A dry pulp consisting of 60% mechanical wood pulp and 40% unbleached sulphite cellulose is beaten in a Hollander with sufficient water and up to a grinding degree of 40°SR (Schopper-Riegler degree), such that the dry content is just above 2.5%, and the mixture is then adjusted with water to exactly 2.5% dry content of the thick pulp.

200 Parts of this thick pulp are mixed with 5 parts of a 0.25% acetic acid solution of the dyestuff of Example 1 and stirred for ca. 5 minutes. Then 2% rosin size and 4% alum (based on the dry weight) are added and again homogeneous stirring is effected for a further few minutes. The mass is diluted with ca. 500 parts of water to 700 parts by volume, and paper sheets are formed in known manner by drawing through a sheet former. The paper sheets have an intense turquoise shade.

APPLICATION EXAMPLE G

15 Parts of waste paper (woody), 25 parts of bleached mechanical wood pulp and 10 parts of unbleached sulphate cellulose are debibrated in a pulper to a 3% aqueous pulp slurry. This stock suspension is diluted to 2% in a dyeing chest. To this diluted suspension there are added 5% by weight kaolin and then 0.6 part of a 5% acetic acid solution of the dyestuff of Example 1, the % being based on the dry weight of fibres, whilst stirring. After 20 minutes, a 1% rosin size dispersion (based on the dry weight of fibres) is added to the pulp in the mixing chest. The homogeneous pulp slurry is then adjusted to pH 5 by the addition of alumin the paper machine shortly before starting up.

A 80 g/m² mill-finished bag paper of turquoise colour is produced on the paper machine. The resulting dyed paper exhibits very good fastness properties to bleeding according to DIN 53 991.

The resulting paper can be almost completely decolourised with hypochlorite.

Any one of the dyestuffs of Examples 2 to 20 may be used in place of that of Example 1 in any one of Application Examples F and G. The waste water exhibits a substantially low residual dyestuff concentration.

What is claimed is:

1. A compound of the formula

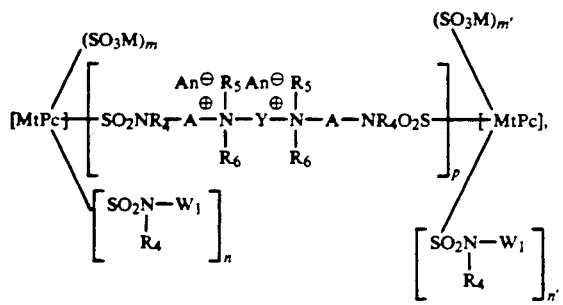

or a mixture thereof, wherein
each Mt is independently copper, nickel or cobalt,
each Pc is the phthalocyanine radical,
each $R_4$ is independently hydrogen, $C_{1-4}$alkyl or $C_{1-4}$alkyl monosubstituted by hydroxy,
each $R_5$ and $R_6$ is independently $C_{1-4}$alkyl; $C_{1-4}$alkyl monosubstituted by halo, cyano, hydroxy or phenyl; or $C_{5-6}$cycloalkyl,
each $W_1$ is independently -A-$\oplus NR_1R_2R_3$ An$^\ominus$ or -A-$NR_2R_3$, wherein
$R_1$ is hydrogen; $C_{1-4}$alkyl; $C_{1-4}$alkyl monosubstituted by halo, cyano, hydroxy or phenyl; or $C_{5-6}$cycloalkyl, and
each of $R_2$ and $R_3$ is independently $C_{1-4}$alkyl; $C_{1-4}$alkyl monosubstituted by halo, cyano, hydroxy or phenyl; or $C_{5-6}$cycloalkyl,
$Y_1$ is linear or branched $C_{2-6}$alkylene; linear or branched $C_{3-8}$alkylene monosubstituted or disubstituted by hydroxy; linear or branched $C_{2-6}$alkylene interrupted by -O-, -NR$_7$- or

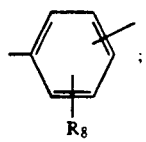

or $C_{3-8}$alkylene monosubstituted or disubstituted by hydroxy and interrupted by -O-, -NR$_7$- or

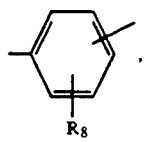

wherein
$R_7$ is hydrogen or $C_{1-6}$alkyl, and
$R_8$ is hydrogen, halo, $C_{1-4}$alkyl or $C_{1-4}$alkoxy,
each M is independently hydrogen or a non-chromophoric cation,
each of m and m' is independently 0 or 1,
each of n and n' is independently 1, 2 or 3, and p is 1 or 2,
with the provisos that $m+n+p \leq 4$, and $m'+n'+p \leq 4$,
wherein
each A is independently linear or branched $C_{2-6}$alkylene or linear or branched $C_{3-6}$alkylene monosubstituted by hydroxy, and
each an $\ominus$ is independently a non-chromophoric anion.

2. A compound according to claim 1, or a mixture thereof, wherein each Mt is independently copper or nickel.

3. A compound according to claim 1, or a mixture thereof, wherein each $R_4$ is independently hydrogen, methyl, ethyl or 2-hydroxyethyl.

4. A compound according to claim 1, or a mixture thereof, wherein each A is independently linear or branched $C_{2-4}$alkylene or linear or branched $C_{3-4}$alkylene monosubstituted by hydroxy.

5. A compound according to claim 4, or a mixture thereof, wherein
each $W_1$ is independently -A$_1$-N$^\ominus R_{1a}R_{2a}R_{3a}$ An$^\ominus$ or -A$_1$-NR$_{2a}R_{3a}$, wherein
$A_1$ is linear or branched $C_{2-4}$alkylene or linear or branched $C_{3-4}$alkylene monosubstituted by hydroxy,
$R_{1a}$ is hydrogen; methyl; ethyl; $C_{2-3}$alkyl monosubstituted by chloro, cyano or hydroxy; benzyl; or cyclohexyl, and
each of $R_{2a}$ and $R_{3a}$ is independently methyl; ethyl; $C_{2-3}$alkyl monosubstituted by chloro, cyano or hydroxy; benzyl; or cyclohexyl.

6. A compound according to claim 1, or a mixture thereof, wherein which each $R_5$ and $R_6$ is independently methyl; ethyl; $C_{2-3}$alkyl monosubstituted by chloro, cyano or hydroxy; benzyl; or cyclohexyl.

7. A compound according to claim 1, or a mixture thereof, wherein each M is independently hydrogen, lithium, sodium, potassium, ammonium, methylammonium, dimethylammonium, trimethylammonium, tetramethylammonium, ethylammonium, diethylammonium, triethylammonium, tetraethylammonium, (2-hydroxyethyl)ammonium, di-(2-hydroxyethyl)ammonium or tri-(2-hydroxyethyl)ammonium.

8. A compound according to claim 1 having the formula

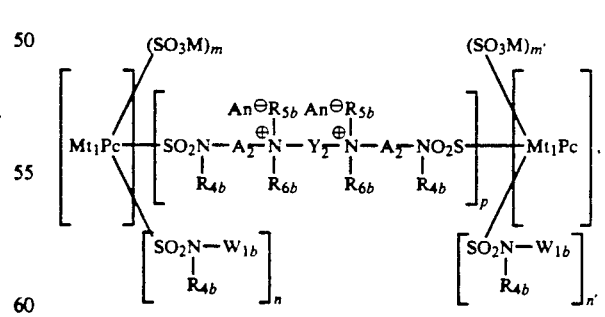

or a mixture thereof, wherein
each $R_{4b}$ is independently hydrogen or methyl,
each $R_{5b}$ and $R_{6b}$ is independently methyl, ethyl, 2-hydroxyethyl, 2-hydroxypropyl, 3-hydroxypropyl, benzyl or cyclohexyl,
each $W_{1b}$ is independently -A$_2$-N$^\oplus R_{1b}R_{2b}R_{3b}$ An$^\ominus$ or -A$_2$-NR$_{2b}R_{3b}$, wherein $R_{1b}$ is hydrogen, methyl, ethyl, 2-hydroxyethyl, 2-hydroxypropyl, 3-hydroxypropyl, benzyl or cyclohexyl, and each $R_{2b}$ and $R_{3b}$ is independently methyl, ethyl, 2-hydroxyethyl, 2-hydroxypropyl, 3-hydroxypropyl, benzyl or cyclohexyl, $Y_2$ is linear or branched $C_{2-4}$alkylene; linear or branched $C_{3-4}$alkylene monosubstituted by hydroxy; or $-T_1-X-T_2-$, wherein each of $T_1$ and $T_2$ is independently linear or branched $C_{1-3}$alkylene or linear or branched $C_{3-4}$alkylene monosubstituted by hydroxy, and X is $-NR_{7a}-$ or

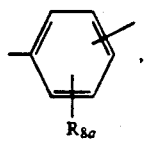

wherein $R_{7a}$ is hydrogen or $C_{1-4}$alkyl, and $R_{8a}$ is hydrogen, chloro, methyl or methoxy, and each $Mt_1$ is independently copper or nickel, wherein each $A_2$ is independently linear or branched $C_{2-4}$alkylene.

9. A compound according to claim 8, or a mixture thereof, wherein each M is independently hydrogen, lithium, sodium, potassium, ammonium, methylammonium, dimethylammonium, trimethylammonium, tetramethylammonium, diethylammonium, triethylammonium, tetraethylammonium, (2-hydroxyethyl)ammonium, di-(2-hydroxyethyl)ammonium or tri-(2-hydroxyethyl)ammonium.

10. A compound according to claim 8, or a mixture thereof, wherein each $W_{1b}$ is independently $-A_3-\oplus NR_{1c}R_{2c}R_{3c}$ $An^{\ominus}$ or $-A_3-NR_{2c}R_{3c}$, wherein $A_3$ is $-(CH_2)_{q'}-$, wherein $q'$ is 2 or 3, $R_{1c}$ is hydrogen, methyl or ethyl, and each of $R_{2c}$ and $R_{3c}$ is independently methyl or ethyl.

11. A compound according to claim 8, or a mixture thereof, wherein each $A_2$ is independently $-(CH_2)_{q'}-$, wherein $q'$ is 2 or 3.

12. A compound according to claim 8, or a mixture thereof, wherein each $R_{4b}$ is hydrogen.

13. A compound according to claim 8, or a mixture thereof, wherein $Y_2$ is linear or branched $C_{2-3}$alkylene; linear or branched $C_{3-4}$alkylene monosubstituted by hydroxy; or

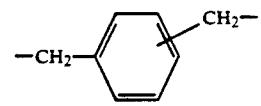

14. A compound according to claim 13, or a mixture thereof, wherein which each $R_{5b}$ and $R_{6b}$ is independently methyl or ethyl.

15. A compound according to claim 14, or a mixture thereof, wherein each $A_2$ is independently $-(CH_2)_{q'}-$, wherein $q'$ is 2 or 3, each $R_{4b}$ is hydrogen, each $W_{1b}$ is independently $-A_3-N^{\oplus}R_{1c}R_{2c}R_{3c}$ $An^{\ominus}$ or $-A_3-NR_{2c}R_{3c}$, wherein $A_3$ is $-(CH_2)_{q'}-$, wherein $q'$ is 2 or 3, $R_{1c}$ is hydrogen, methyl or ethyl, and each of $R_{2c}$ and $R_{3c}$ is independently methyl or ethyl.

16. A compound according to claim 15, or a mixture thereof, wherein m is 0, m' is 0, n and n' are both 2 or are both 3, and p is 1, with the provisos that (i) the $Mt_1$'s are identical, the $R_{5b}$'s are identical, the $R_{6b}$'s are identical, the $W_{1b}$'s are identical, the $A_2$'s are identical, and the $An^{\ominus}$'s are identical, and (ii) none of the four subrings of each phthalocyanine radical contains more than one substituent selected from $-SO_2NH-W_{1b}$ and

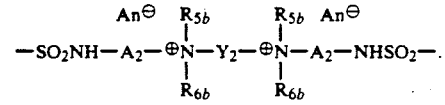

17. A mixture of compounds according to claim 16 having the formula

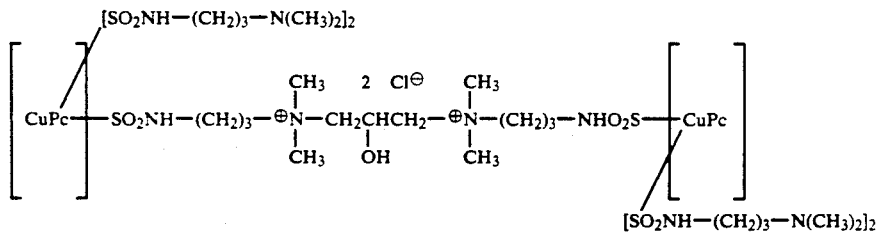

18. A storage-stable, aqueous liquid dyeing preparation containing a water-soluble compound according to claim 1.

19. A process for dyeing or printing an hydroxy group- or nitrogen-containing organic substrate comprising applying to an hydroxy group- or nitrogen-containing organic substrate a compound or mixture according to claim 1.

20. A process according to claim 19, wherein the substrate is paper.

* * * * *